United States Patent [19]
Opresco

[11] Patent Number: 5,476,173
[45] Date of Patent: Dec. 19, 1995

[54] PACKAGING CONSTRUCTION

[76] Inventor: Ovidiu Opresco, 246 W. 16th St., Ground Floor, New York, N.Y. 10011

[21] Appl. No.: 230,339

[22] Filed: Apr. 20, 1994

[51] Int. Cl.$^6$ ................................................. B65D 85/30
[52] U.S. Cl. ........................ 206/309; 206/308.1; 206/45.2
[58] Field of Search .................................... 206/309, 444, 206/452, 303, 308.1, 445; 220/254, 4.21

[56] References Cited

U.S. PATENT DOCUMENTS

| | | | |
|---|---|---|---|
| 3,305,205 | 2/1967 | Frankl | 206/45.2 |
| 3,429,629 | 2/1969 | Cilia | 206/309 |
| 3,751,760 | 8/1973 | Wakeman | 16/150 |
| 4,185,313 | 1/1980 | Green et al. | 206/444 |
| 4,387,807 | 6/1983 | de la Rosa | 206/309 |
| 4,635,792 | 1/1987 | Yamada et al. | 206/310 |
| 4,702,369 | 10/1987 | Philosophe | 206/309 |
| 4,736,840 | 4/1988 | Deiglmeier | 206/309 |
| 4,805,769 | 2/1989 | Soltis et al. | 206/309 |
| 4,886,162 | 12/1989 | Ambrogio | 206/303 |
| 5,168,991 | 12/1992 | Whitehead et al. | 206/310 |
| 5,188,229 | 2/1993 | Bernstein | 206/312 |
| 5,236,081 | 8/1993 | Fitzsimmons et al. | 206/44 R |

*Primary Examiner*—Paul T. Sewell
*Assistant Examiner*—Tara L. Laster
*Attorney, Agent, or Firm*—Pearne, Gordon, McCoy & Granger

[57] ABSTRACT

A versatile, ecological, and economical package including, in one form, plastic inner and outer rings or circular frames, and two recycled paperboard face sheets. The inner and outer rings each have an annular portion and a face portion inwardly extending from opposite ends of the annular portions. Each of the face portions form an opening. The face sheets each have a diameter larger than the diameter of the openings so that the face sheets are retained within the outer and inner rings. The rigid inner and outer rings arid the semi-rigid face sheets collectively provide rigid package faces. Also disclosed are variants in the construction of the rings and holder as well as certain accessory elements. In another form, a holder or package of unitary construction includes two protection sheets, and a side portion at the peripheries of the protection sheets and extending between the protection sheets. The protection sheets each have a fixed portion, a hinged portion, and a living hinge pivotally connecting the hinged portion to the fixed portion. The side portion has a fixed portion extending between the protection sheet fixed portions and at least one hinged portion extends between the hinged portions of the protection sheets. Also disclosed are variants of the package of unitary construction.

23 Claims, 13 Drawing Sheets

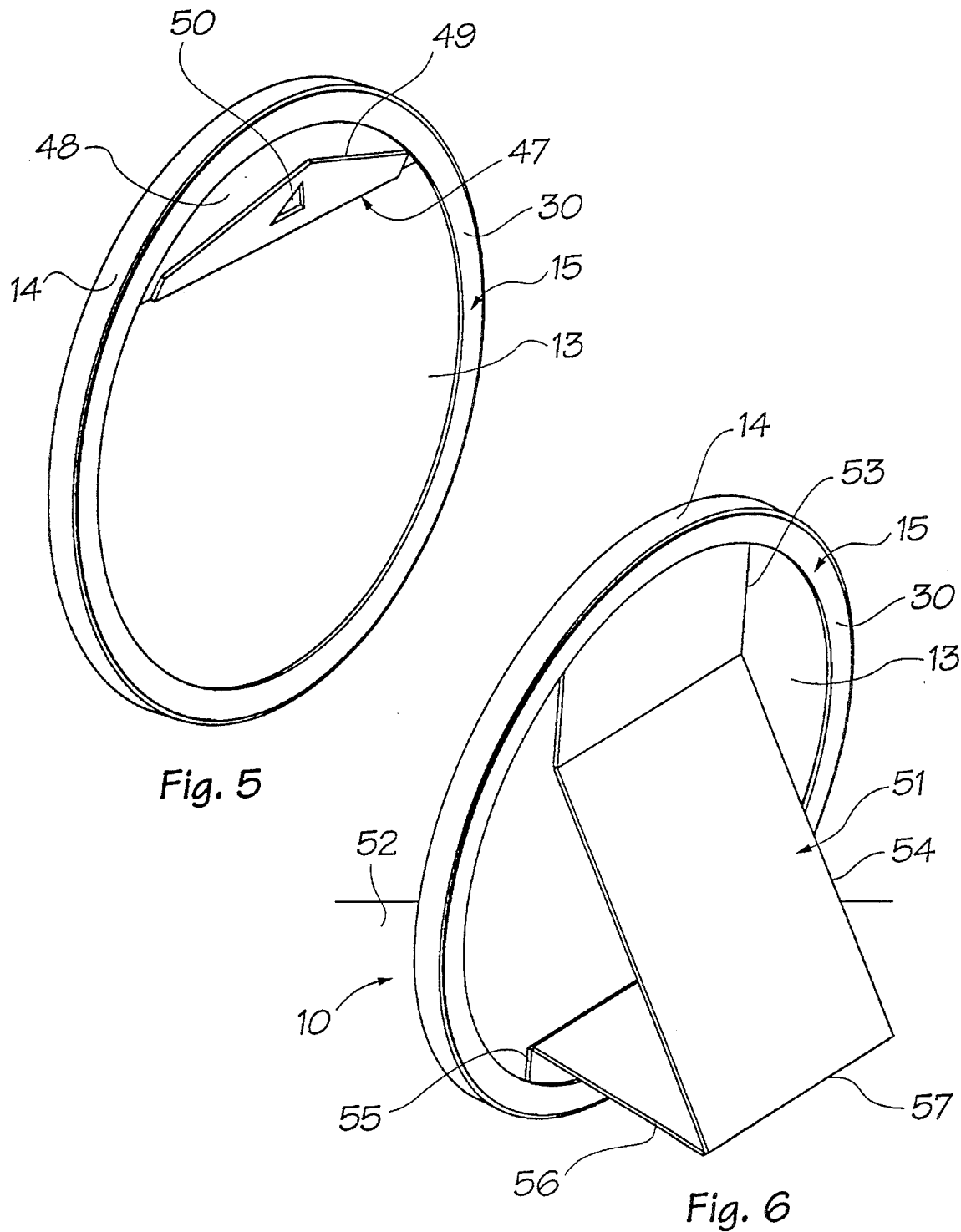

PACKAGING CONSTRUCTION

BACKGROUND OF THE INVENTION

1. Field of the Invention

The invention generally relates to packaging, and more particularly to more ecological and economical packaging.

2. Description of the Prior Art

The predominant package for a compact disc (CD) is currently a three-piece molded plastic box known as a "jewel box". The jewel box includes transparent rectangular front and back covers, and an opaque compact disc holder. The front and back panels are typically hingedly connected along one edge. The compact disc holder snaps onto the back cover to retain or support the CD. Paper inserts or booklets containing graphics and information are typically included in the package such that they are retained to and visible through the front and back covers.

A CD typically measures approximately 120 mm in diameter and 1 mm in thickness. In comparison, the jewel box measures about 143 mm by 125 mm by 10.4 mm. Therefore, the jewel box is volumetrically larger than the CD by more than an order of magnitude. The jewel box not only is larger than necessary, but also requires great quantities of plastic that is not commonly recyclable and is non-biodegradable. As with any consumer good today, there is a strong interest in making packaging more ecological by reducing the use of non-recyclable materials or non-biodegradable.

Further, the jewel box front cover is not opened easily. Gripping the jewel box with one hand while pulling open the front cover with the other hand often proves to be a difficult task, especially for small or older hands. Once open, prying the CD from the compact disc holder is not easily accomplished. The difficulty of removing and replacing the booklet in the front cover nearly eliminates the use of the booklet. During any of these maneuvers the , 10 jewel box can easily be dropped, which, being polystyrene, often breaks.

Besides being cumbersome, the jewel box is difficult and expensive to construct because it includes at least three separate plastic pieces that fit together. The tooling to produce the jewel box and disk holder are expensive to build and maintain. Moreover, while parts of the packaging process are automated, there are several operations which are performed by hand.

SUMMARY OF THE INVENTION

It is an important purpose of the present invention to provide an aesthetically pleasing and structurally durable package in which to display and store a CD or other item such as, for example, circular saw blades, gears, or blister card type medication. It is also a purpose of the present invention to provide a package that protects the contents of the package while greatly reducing use of plastic. It is another purpose of the present invention is to provide a package that utilizes recycled/recyclable materials to a greater extent and that is more ecological by making the components easily separable for reuse or recycling. It is a further purpose of the present invention to provide a package that can be easily opened and closed, yet easily adaptable to be child resistant. It is yet a further purpose of the present invention to provide a package that is comparatively inexpensive to produce. It is also a further purpose of the present invention to provide a package that can be assembled by a fully automated process.

In accordance with a first embodiment of the invention, there is provided a package for holding a disc including two circular semi-rigid protection faces each having a diameter approximately the same size as an outside diameter of the disc, and a ring or circular frame at the peripheries of the protection faces to retain the disc between the protection faces. Preferably, the protection faces are provided by removable face sheets, and the ring is provided by two separable concentric inner and outer rings which retain the face sheets and the disc therebetween, within the ring.

In accordance with a second embodiment of the invention, there is provided a package including, like the first embodiment, two circular semi-rigid protection faces. A unitary ring or circular frame at the peripheries of the protection faces retains the disc between the protection faces. Preferably the ring is formed of suitable elastic material. As in the first embodiment, a disc holder of unitary construction can be provided between the face sheets for protecting and supporting the disc.

In accordance with a third embodiment of the invention, there is provided a CD package including two rectangularly shaped semi-rigid protection faces each approximately the same size as the outside diameter of the CD, and a rectangular frame at the peripheries of the protection faces to retain the CD between the protection faces. Preferably, the protection faces are provided by removable face sheets, and the rectangular frame is provided by two separable top and bottom members which retain the face sheets, and the CD therebetween, within the frame.

In accordance with a fourth embodiment of the invention, there is provided a package having a holder of unitary construction. The holder includes two protection sheets, and a ring or side portion at the peripheries of the protection sheets and extending between the protection sheets. The protection sheets each have a fixed portion, a hinged portion, and a living hinge pivotally connecting the hinged portion to the fixed portion. The side portion has a fixed portion extending between the protection sheet fixed portions and at least one hinged portion extending between the hinged portions of the protection sheets.

BRIEF DESCRIPTION OF THE DRAWINGS

These and other features and advantages of the present invention will be apparent with reference to the following description taken in conjunction with the accompanying drawings, wherein:

FIG. 5 is a perspective view of the package of the first embodiment with the addition of an insert for hanging the package;

FIG. 6 is a perspective view of the package of the first embodiment with the addition of an insert for supporting the package;

3

Figure 9:
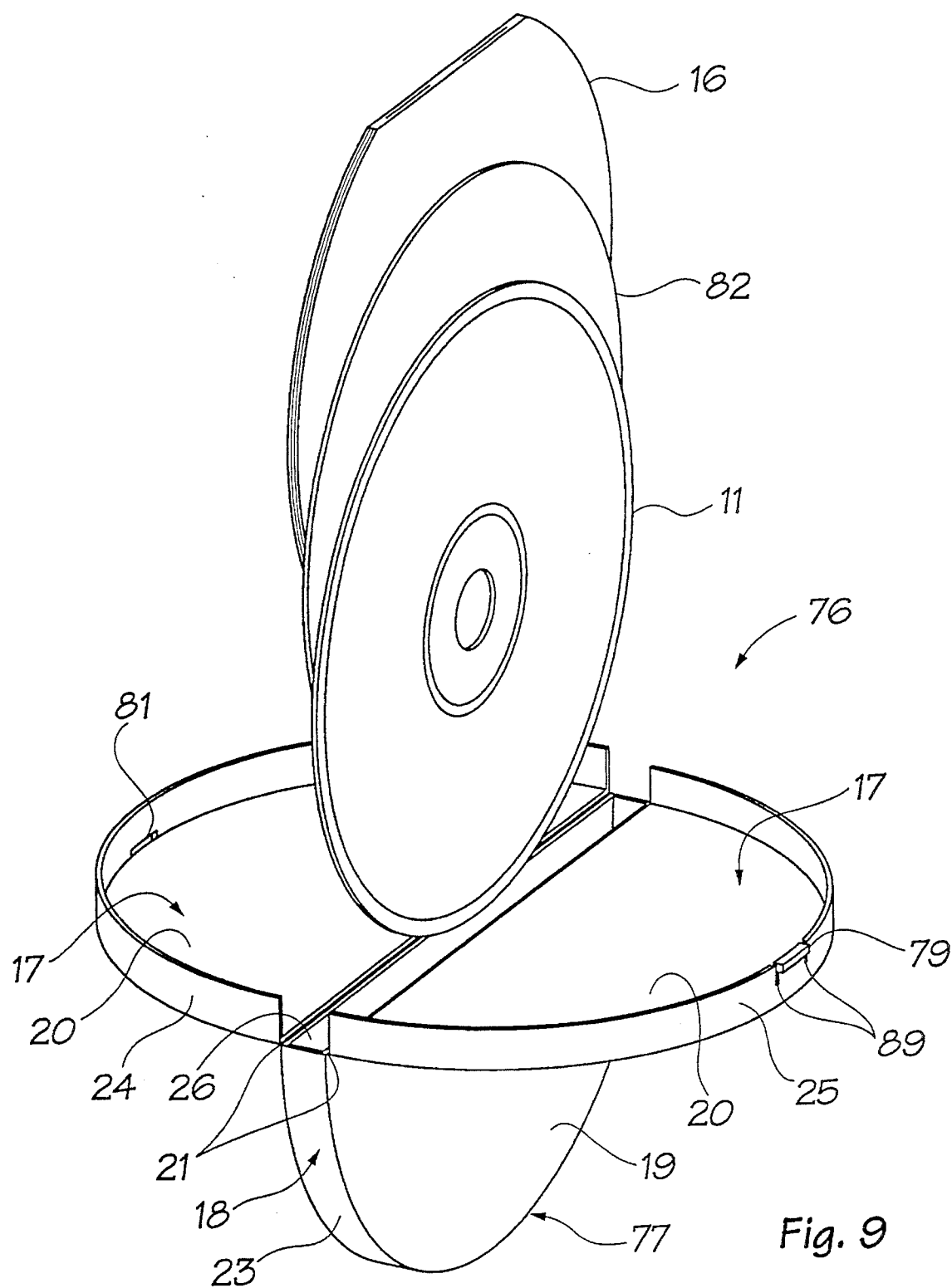
Figure 10:
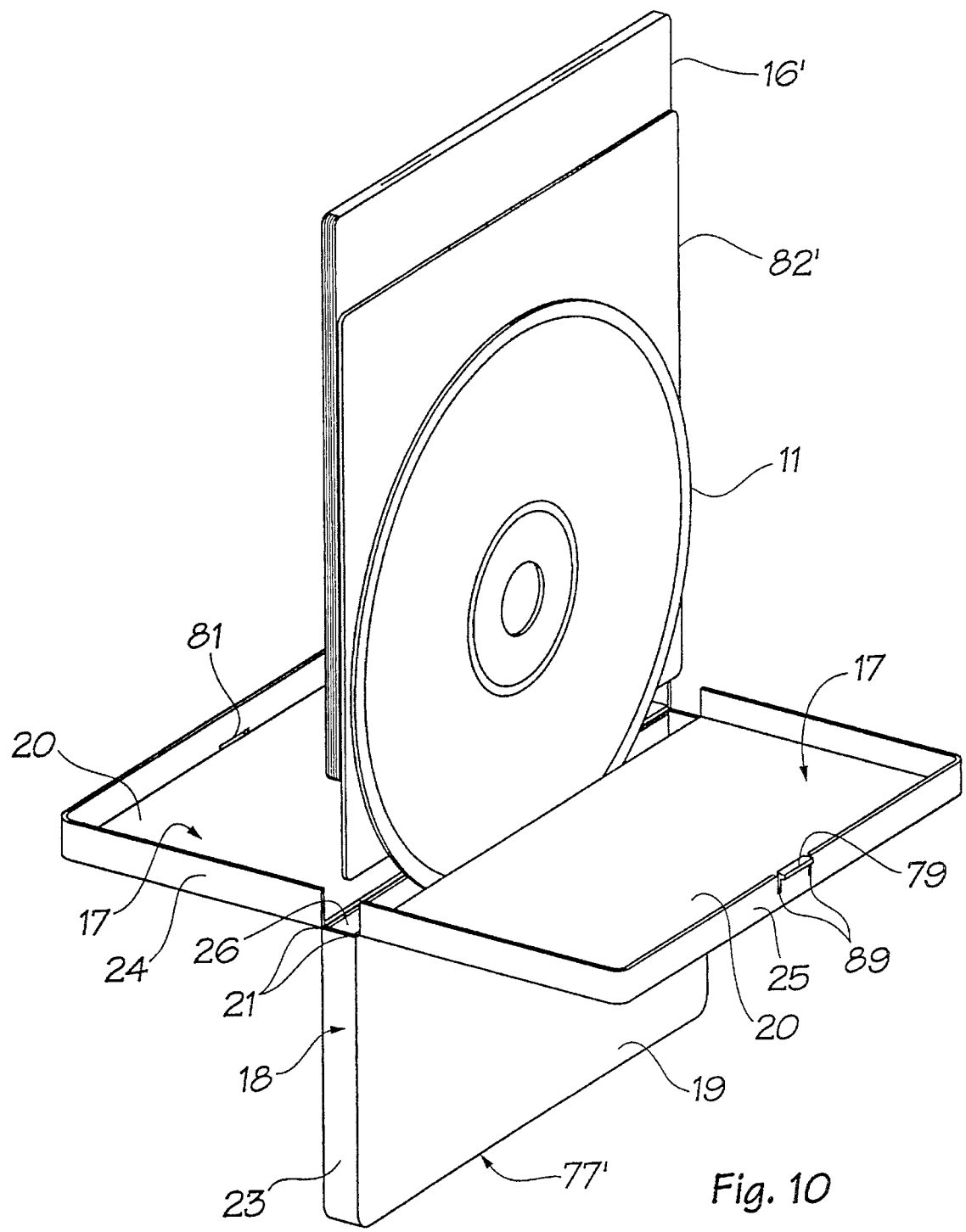
Figure 11:
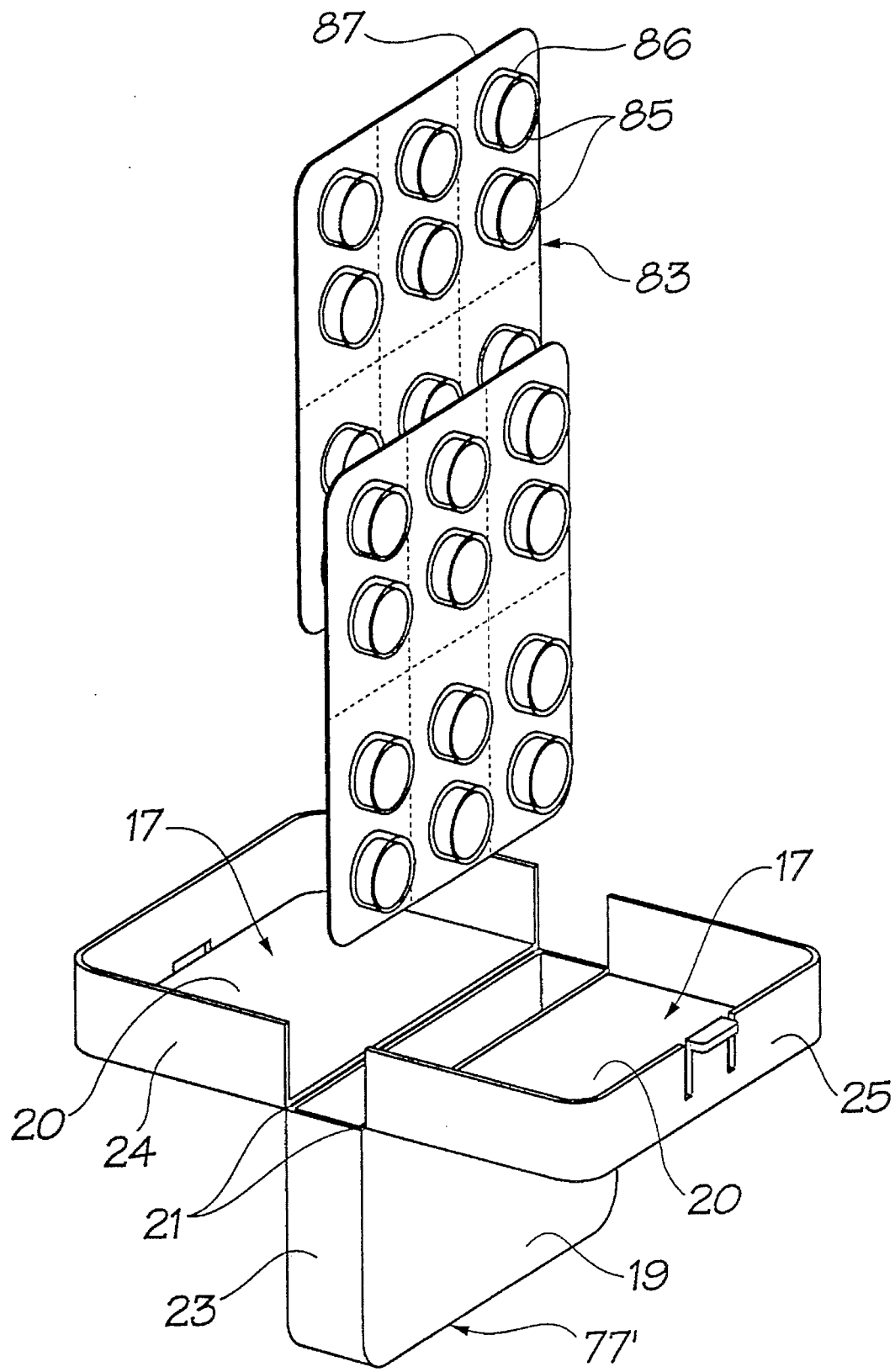
Figure 12:
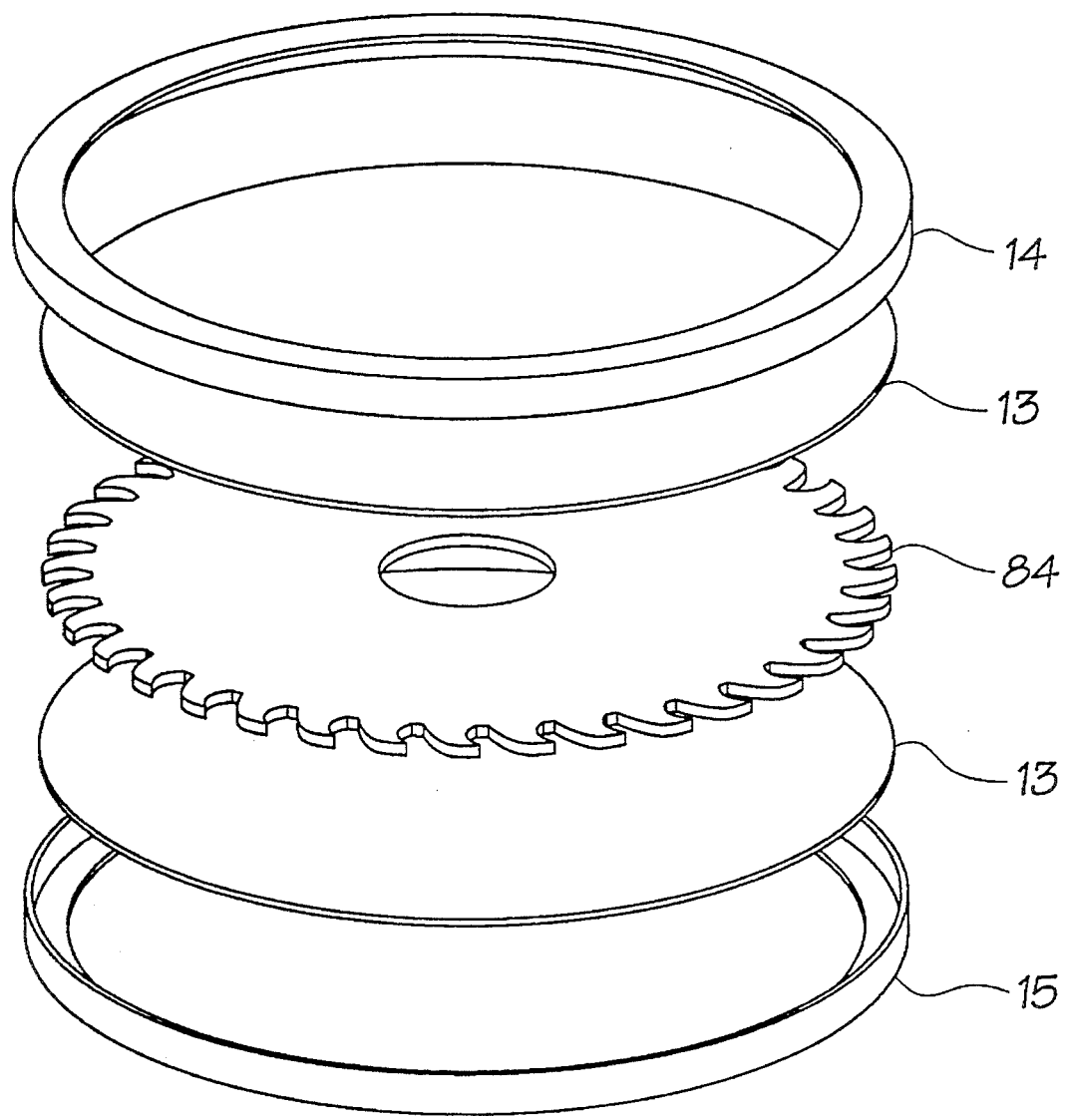
Figure 13:
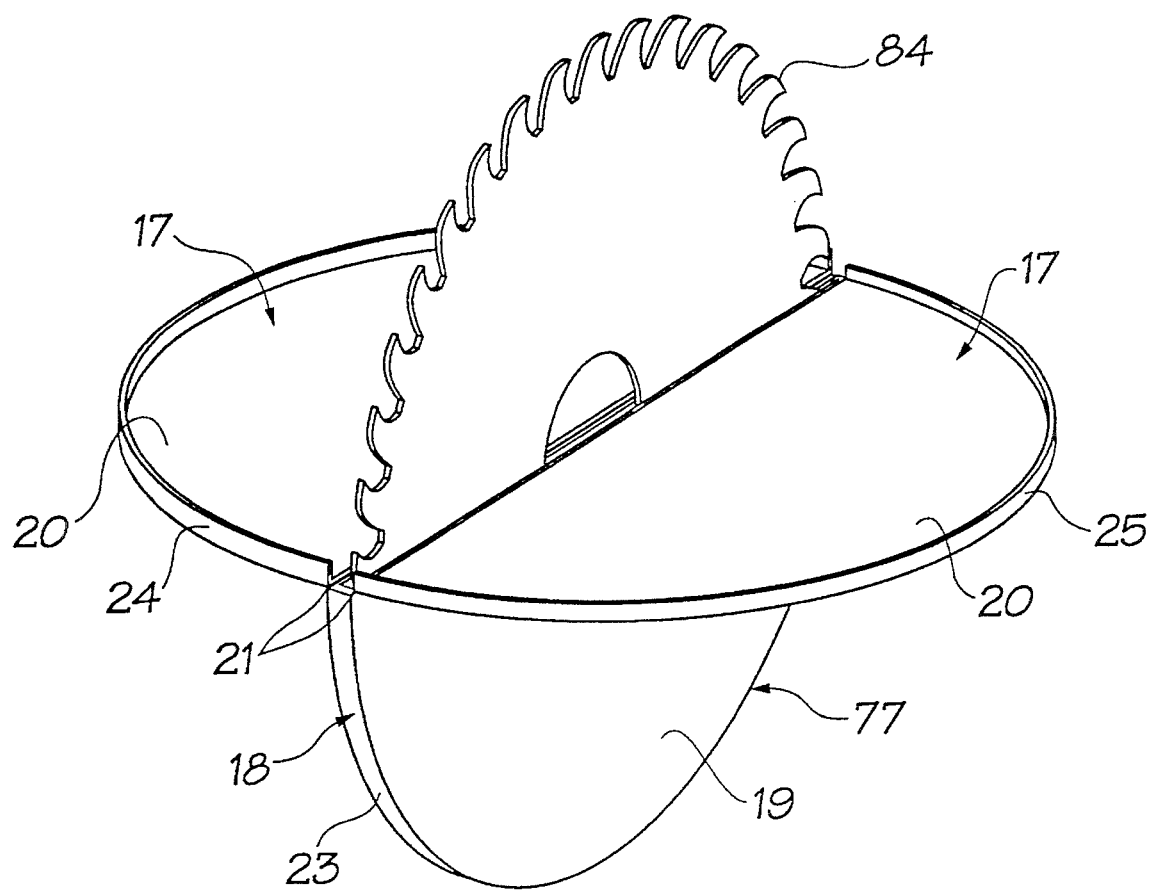
Figure 14:
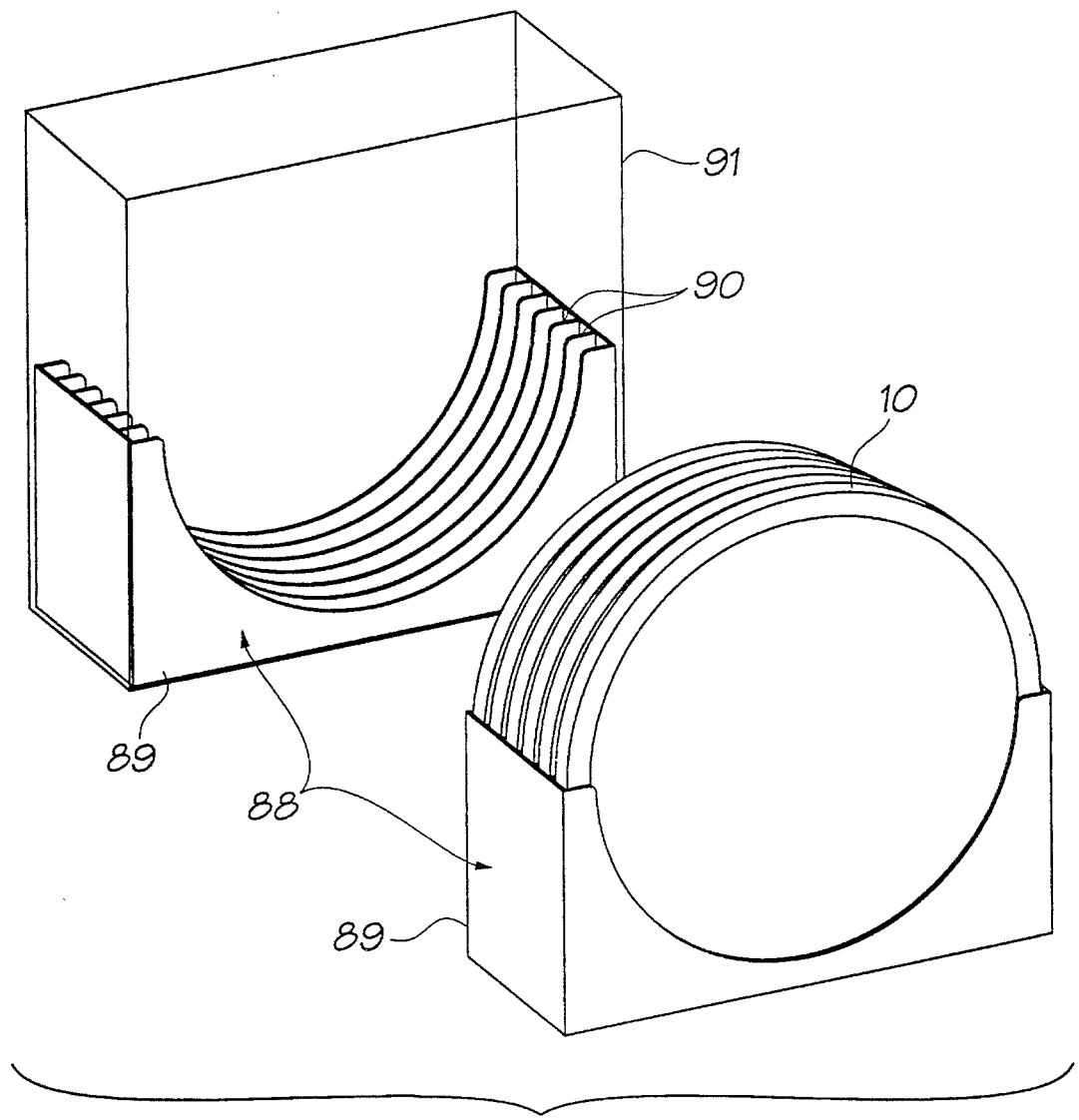

FIG. 9 is an exploded view of a fourth embodiment of the package according to the present invention holding a CD;

FIG. 10 is an exploded view of a variation of the fourth embodiment;

FIG. 11 is an exploded view of another variation of the fourth embodiment holding blister card type medication;

FIG. 12 is an exploded view of yet another variation of the first embodiment holding a circular saw blade;

FIG. 13 is a perspective view of a variation of the fourth embodiment holding a circular saw blade; and FIG. 14 is a perspective view of a holder for display or storage of several of the packages of the present invention.

DETAILED DESCRIPTION OF THE PREFERRED EMBODIMENTS

Figure 1:
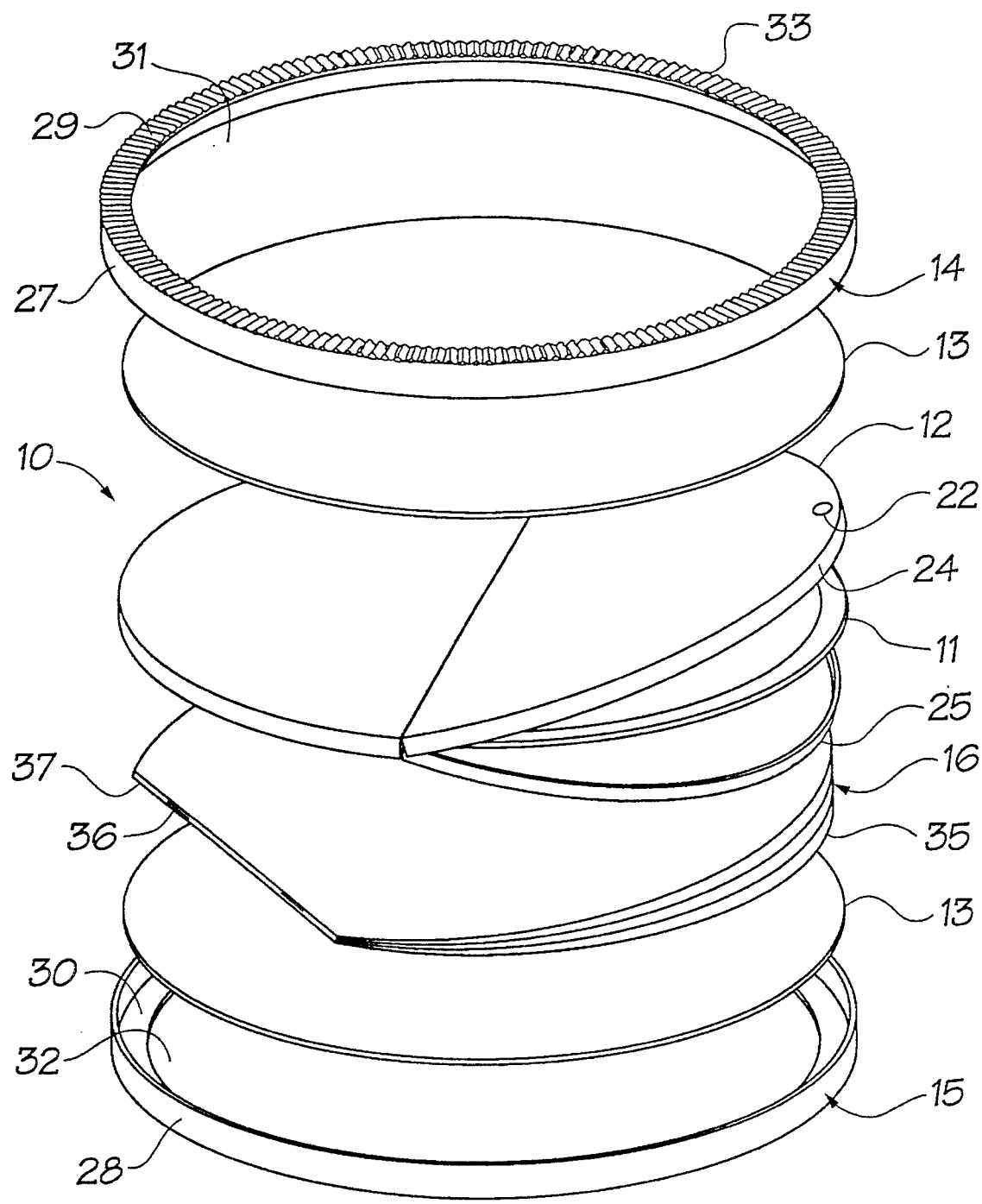
FIG. 1 is an exploded view of a first embodiment of a package according to the present invention holding a CD.

With reference to FIG. 1, a package 10 according to a first embodiment of the present invention is shown. The package 10 includes a compact disc (CD) 11, a disc holder 12, two protection faces or face sheets 13, a first or outer ring or frame 14, a second or inner ring or frame 15, and a booklet 16. It will be noted that the package according to the invention can be used for other discs such as, for example, circular saw blades and gears.

The CD 11 is a thin somewhat flexible plastic resin sheet with a digitally recorded and engraved pattern. CD's 11 are manufactured according to set standards and specifications promulgated by the N. V. Philips' Gloeilampenfabrieken, Eindohoven, the Netherlands, and the Sony Corporation, Tokyo, Japan. The CD 11 measures approximately 120 mm in diameter and 1 mm in thickness.

A laser enclosed in a compact disk player (not shown) directs one or more beams onto the surface of the CD 11 at a constant angle, at least one beam being reflected off the CD 11 at varying angles dependent upon the engraved pattern. In simplest form, a reflected beam would be directed either at or away from a photoelectric receiver, thus creating a binary series of pulses corresponding to the digital recording, which are then converted back into an analog signal or directly into audio sound. CD's 11 are used for a variety of data recording and retrieval purposes including microcomputer read-only-memory (CD-ROM) systems, interactive video, and prerecorded stereo music.

Figure 2:
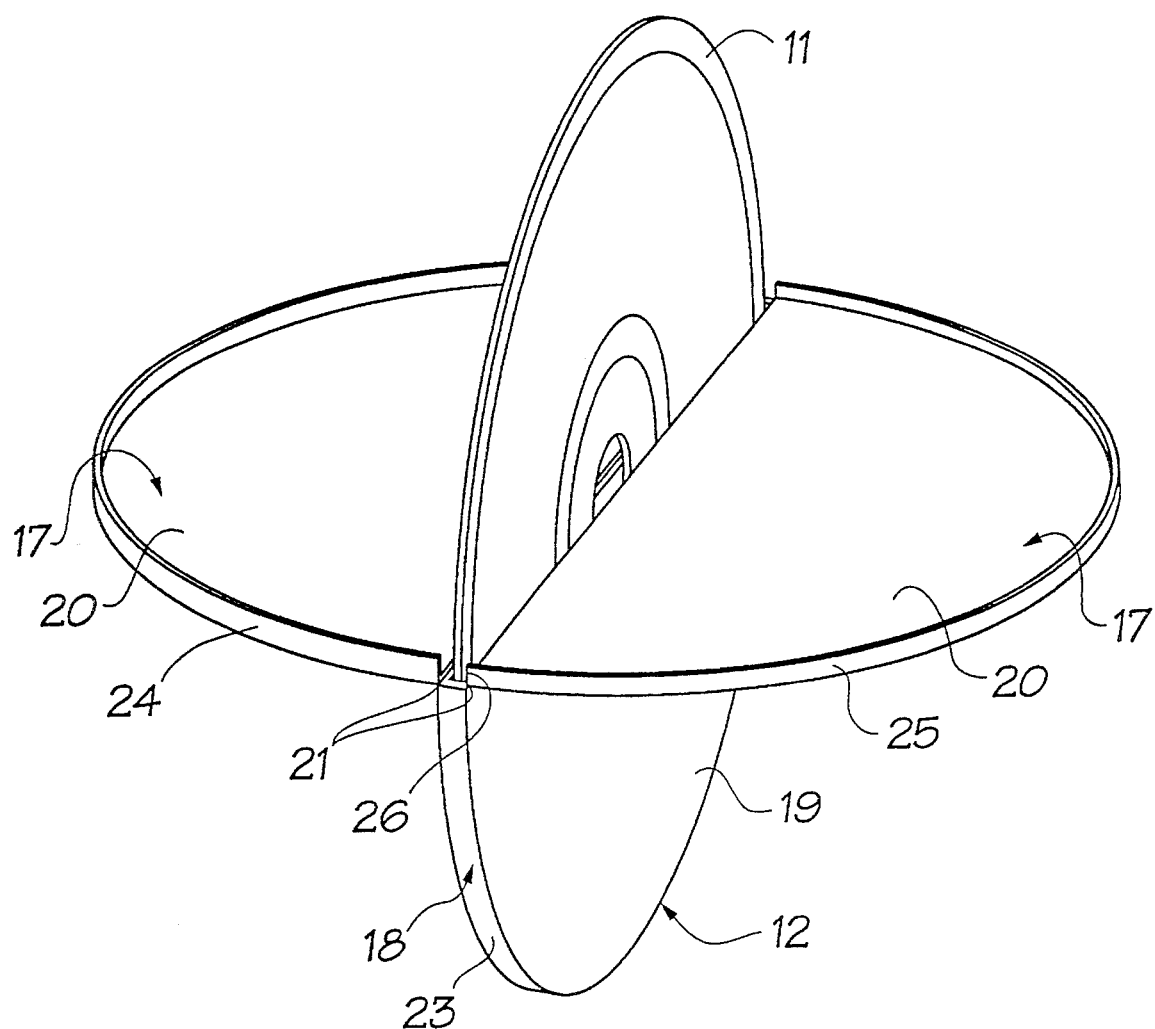
FIG. 2 is a perspective view of a disc holder of the package of FIG. 1.

As best seen in FIG. 2, the disc holder 12 includes two opposed protection sheets 17 and side portion or ring 18. The protection sheets 17 are circularly-shaped having a diameter preferably slightly larger than the diameter of the CD 11 and a thickness approximately equal to the thickness of the CD 11. Each of the protection sheets 17 has a first or fixed portion 19 and a second or hinged portion 20. Hinges 21 connecting each of the hinged portions 20 to the fixed portions 19 are preferably living hinges but could comprise other hinge or pivoting means. A polypropylene living hinge has a life of over 5,000 cycles. The hinges 21 must be located such that the hinged portions 20 make up substantially at least one half of the protection sheets 17. Preferably, the hinges 21 are parallel to each other and pass through the centerline of the CD 11 or at the median of the protection sheets 17. For other applications the parallel living hinges 21 could be off the median of the protection sheets 17. Additionally, a visible mark 22 (FIG. 1) preferably provides means for indicating the hinged portion 20 of the protection sheet 17.

The ring 18 includes a first or fixed portion 23, a second or outer hinged portion 24, and a third or inner hinged portion 25. The ring fixed portion 23 extends at right angles between the fixed portions 19 of the protection sheets 17 along an outer periphery of the protection sheets 17. The ring outer hinged portion 24 inwardly extends at a right angle from one of the protection sheet hinged portions 20 along an outer periphery of the protection sheet hinged portion 20. The ring inner hinged portion 25 inwardly extends at a right angle from the other of the protection sheet hinged portions 20 along a diameter slightly less than a diameter of the ring outer hinged portion 24. The ring outer hinged portion 24 is concentric with and overlaps the ring inner hinged portion 25 when the protection sheet hinged portions 20 are closed (as best seen in FIG. 1). Preferably, a friction fit between the ring outer and inner hinged portions 24, 25 locks them together when the protection sheets 20 are closed. It will be noted that other suitable locking means could be utilized.

A height of the ring portions 23, 24, 25 is sized such that a cavity 26 of adequate size for holding the CD 11 is formed between the protection sheets 20. It will be noted that the ring portions 23, 24, 25 could be sized for holding additional CD's 11 or other types of inserts. It will also be noted that the ring outer and inner hinged portions 24, 25 could be at the same diameter to combine and form the required height such that they abut one another when the protection faces 20 are closed.

The disc holder 12 is preferably fabricated by injection molding one piece (unitary construction). The preferred position in the mold is shown in FIG. 2. The disc holder 12 is preferably made of a rigid or semi-rigid plastic such as polypropylene, polyethylene, polyvinyl chloride, thermoplastic rubber, or other suitable material. The disc holder 12 preferably has sufficient flexibility to grasp the CD 11 as will be further discussed below.

As shown in FIG. 1, the face sheets 13 are circularly-shaped having a diameter preferably slightly larger than the diameter of the CD 11 and approximately equal to the diameter of the disc holder 12. The face sheets 13 are preferably semi-rigid and die cut from recycled paperboard. Graphics or other information is printed on each side of the face sheets 13. The face sheets 13 can be laminated or varnished. It will be noted that the face sheets 13 could be made of other suitable paper, plastic, or metal materials. It will also be noted that the protection faces or face sheets 13 could be integral with the rings 14, 15. However, having face sheets 13 that are separable from the rings 14, 15 provides great flexibility in choice of print media, eliminates the need for labels, and provides four sides for printing.

The outer and inner rings or frames 14, 15 each include an annular side portion 27, 28 and a face portion 29, 30 respectively. The annular side portion 28 of the inner ring 15 has an inner diameter slightly larger than the diameter of the disc holder 12 and the face sheets 13. The outer ring annular side portion 27 has a diameter sized such that its inner surface engages an outer surface of the inner ring annular side portion 28 when the outer ring 14 is placed on the inner ring 15 such that the annular portions 27, 28 are concentric. Friction between the inner surface of the outer ring 14 and the outer surface of the inner ring 15 retains the rings 14, 15 together. Ideally, the rings 14, 15 telescope to accommodate varying thicknesses of the package 10. It will be noted that the outer ring 14 could alternatively snap, screw or hinge (FIG. 8) with the inner ring 15.

The face portion 29 of the outer ring 14 inwardly extends at a right angle from a top end of the outer ring annular side portion 27. The face portion 29 forms an opening 31 having a diameter less than the diameter of the CD 11, the disk holder 12, and the face sheets 13. The inner ring face portion 30 inwardly extends at a right angle from a bottom end of the inner ring annular portion 28. The face portion 30 forms an opening 32 having a diameter less than the diameter of the CD 11, the disk holder 12, and the face sheets 13, and generally equal in size to the opening 31 of the outer ring.

Preferably, outer surfaces of the face portions 29, 30 of the outer and inner rings 14, 15 are comprised of small planar surface elements forming identical prismatic radial ridges 33. The radial ridges 33 facilitate the stacking of several CD packages 10 together (in a poker chip manner).

Each ring 14, 15 is preferably made of a rigid or semi-rigid plastic such as polypropylene, polyethylene, polyvinyl chloride, thermoplastic rubber. However, the rings 14, 15 could alternately be made of suitable metal or rubber materials.

The booklet 16 includes a plurality of paper pages 35 that are saddle stitched 36 together. The pages 35 are printed, saddle stitched, and die cut into the desired shape. Preferably, the booklet 16 is circularly-shaped having a diameter generally equal to the diameter of the CD 11. The circularly shaped booklet 16 has a truncated edge 37 containing the saddle stitches 36 and about which the pages 35 are pivotable.

Initially the disc holder 12 is opened by pivoting the hinged portions 20 of the protection sheets 17 about the living hinges 21 to the open position shown in FIG. 2. At least one CD 11 is then placed in the cavity 26 between the protection sheets 17 of the disc holder 12. Thereafter, the disc holder 12 is closed by pivoting the hinged portions 20 of the protection sheets 17 about the living hinges 21 until the hinged portions 20 lock together and are adjacent the CD 11. In this closed position the CD 11 is retained within and supported by the disc holder 12.

As best shown in FIG. 1, a "sandwich" is created by placing the disc holder 12 and the booklet 16 between the face sheets 13. It is noted that additional CD's 11, booklets 16, disc holders 12, or other desired inserts could also be included in the sandwich. The sandwich is placed within the inner ring 15 and the outer ring 14 is placed onto the inner ring 15. The outer and inner rings 14, 15 are retained together by friction and the sandwich is retained between the face portions 29, 30 of the outer and inner rings 14, 15. If desired, the package 10 can then be enclosed by shrink wrap (not shown). Alternately, the package 10 can be enclosed in a blister card (not shown) known in the art.

To remove the CD 11, the shrink wrap is first removed. Thereafter, the package 10 is held in both hands such that the outer ring 14 is held with both index fingers and then both thumbs are pressed down on the face sheet 13 adjacent the outer ring face portion 29 to remove the outer ring 14 from the inner ring 15. The sandwich can then be removed by holding the inner ring 15 and pressing up on the face sheet 13 adjacent the inner ring face portion 30. The disk holder 12 is then removed from the sandwich. The disc holder 12 is opened by pivoting the hinged portions 20 of the protection sheets 17 about the living hinges 21 to the open position (FIG. 2). Thereafter, the CD 11 is removed from the disc holder 12.

In compact disc players that accept CD's 11 horizontally, such as in autos, the open disc holder 12 is held horizontally to insert the CD 11 without touching the CD 11. To remove the CD 11 from the compact disc player without touching the CD 11, the open disc holder 12 is placed over the CD 11 and the CD 11 is grasped by squeezing the flexible fixed portions 19 of the protection sheets 17 to pull the CD 11 out of the compact disc player. The CD package 10 can be reassembled as described above for storing the CD 11 (except the shrink wrap or blister card).

Figure 3:
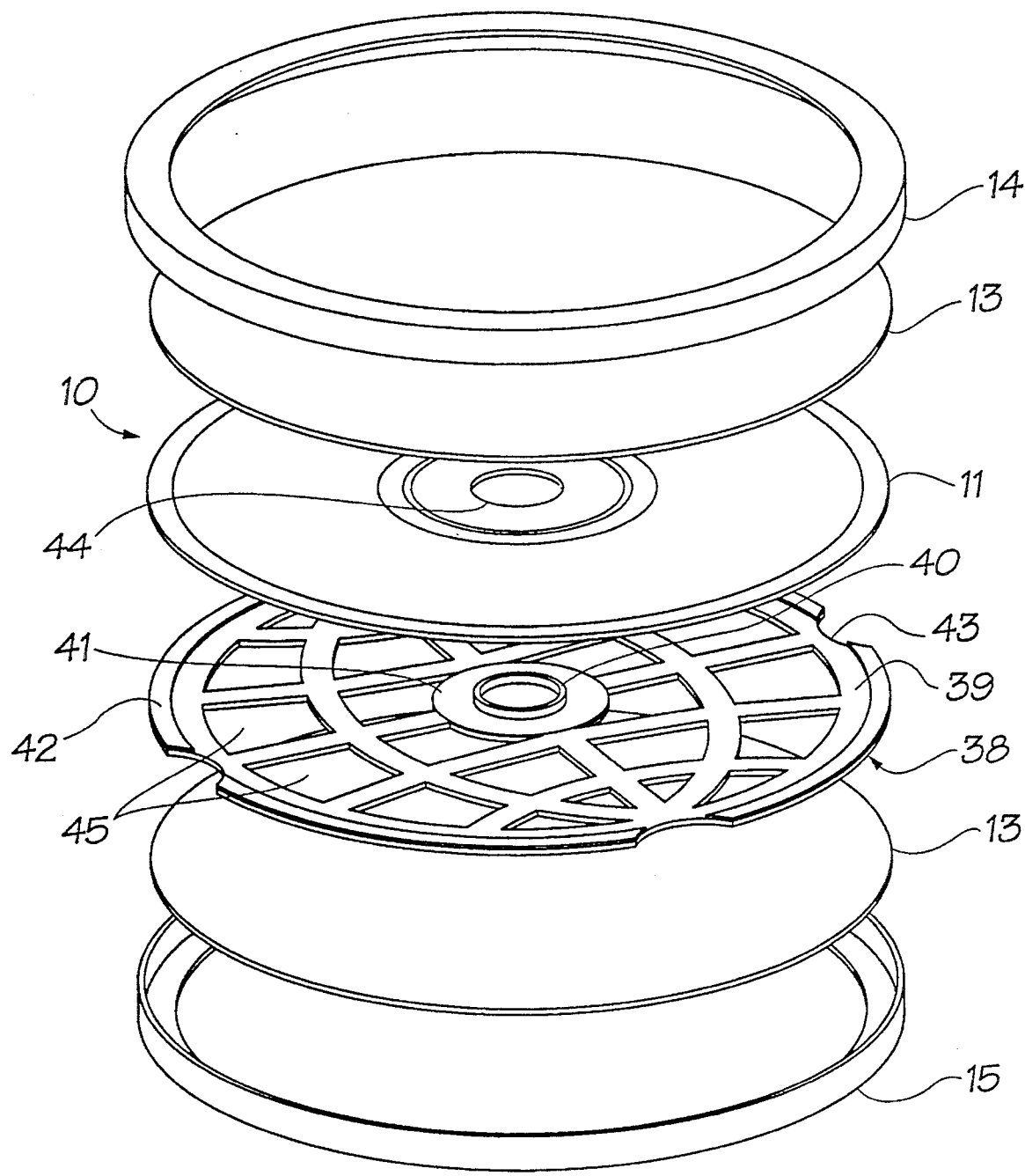
FIG. 3 is an exploded view of a variation of the first embodiment with an open disc holder and without a booklet.

As shown in FIG. 3, the disc holder 12 (FIG. 1) can be substituted with an open disc holder 38. The open disc holder 38 includes a base plate 39, a central holding member 40, and first and second support surfaces 41, 42. The base plate 39 has an outer diameter preferably slightly larger than the CD 11. The outer diameter of the base plate 39 is formed with at least two equally spaced recesses 43 to ease removal of the CD 11 from the open disc holder 38. Formed near a central portion of the base plate 39 is the central holding member 40 having a cylindrically-shaped outer surface sized for engagement with a center hole 44 of the CD 11. The central holding member 40 can be sized for a friction or loose fit with the center hole 44 of the CD 11. The central holding member 40 can alternately be a hub having a plurality flexible projections as is used in a typical CD jewel box. The simplified central holding member 40 shown in FIG. 3., however, reduces tooling cost and simplifies removal of the CD 11.

The first and second support surfaces 41, 42 are ring-shaped and upwardly extending from the base plate 39. The first support surface 41 outwardly extends from the central holding member 40, and the second support surface 42 inwardly extends from a periphery of the base plate 39. Both support surfaces 41, 42 are co-planar and preferably sized to support nonengraved portions of the CD 11 such that the base plate 39 provides protection to the engraved portion of the CD 11 without contacting the engraved portion.

The open disc holder 38 is easily molded and is preferably fabricated by injection molding in one piece (unitary construction). The open disc holder 38 is preferably made of a rigid or semi-rigid plastic such as polypropylene, polyethylene, polyvinyl chloride, thermoplastic rubber, or other suitable material. Additionally, the base plate 39 preferably is formed with openings 45 of any desirable pattern to further reduce plastic consumption.

Figure 4:
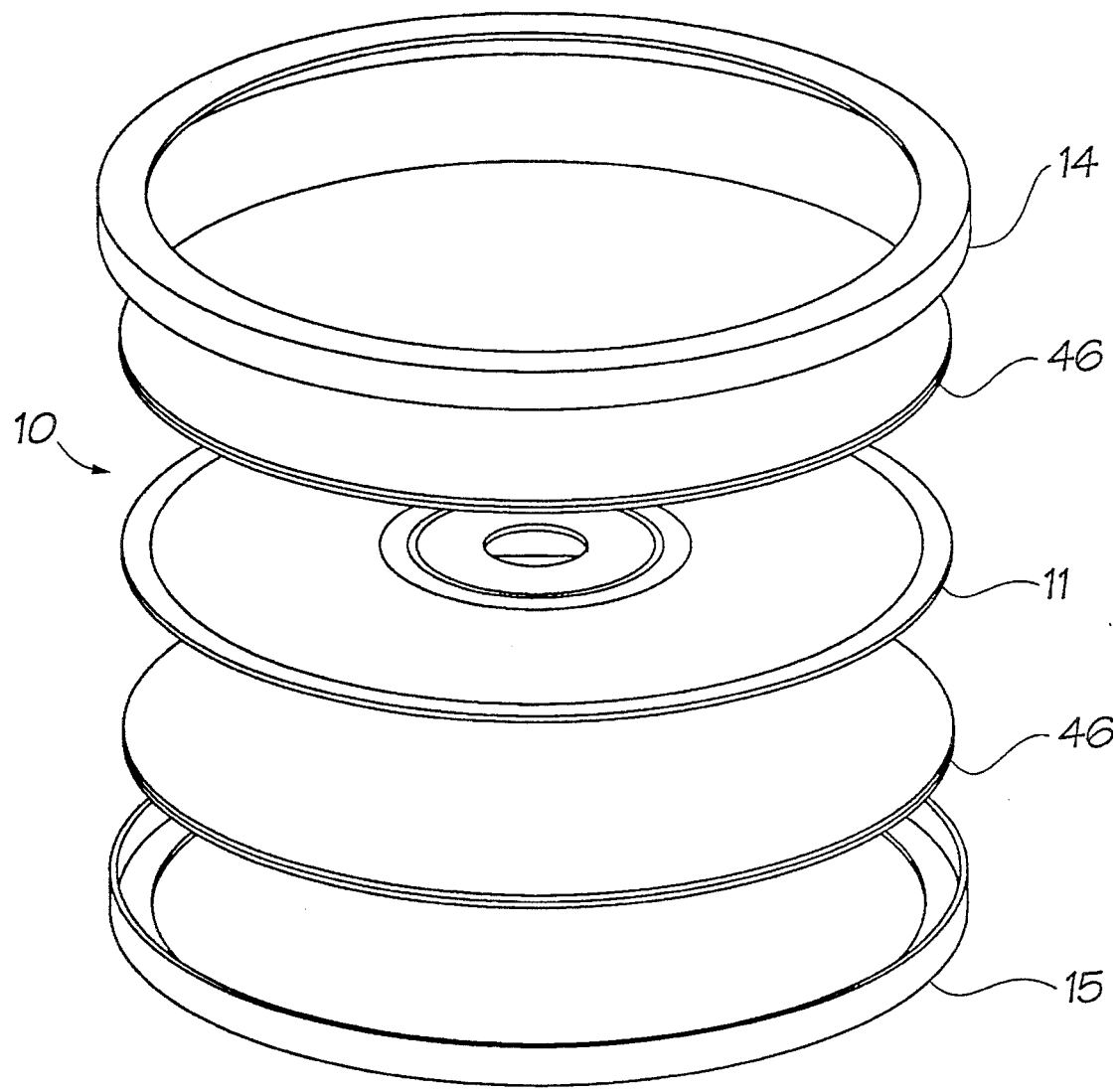
FIG. 4 is an exploded view of another variation of the first embodiment without the disc holder or the booklet.

As shown in FIG. 4, the disc holder 12 (FIG. 1) can be eliminated. In order to provide sufficient rigidity to support the CD 11, rigid face sheets 46 can be provided with a greater thickness than the thickness of the face sheets 13 used with the disc holder 12 (FIG. 1). Alternately, additional face sheets 13 (FIG. 1) can provide the sufficient rigidity required to support the CD 11.

As shown in FIG. 5, the package 10 can further include an insert 47 for hanging the package 10 on a wall or substantially vertical support surface (not shown). The insert 47 has a first or inserting portion 48 and a second or receiving portion 49. The first portion 48 has an arcuate upper edge having a radius generally equal to the inside radius of the annular side portion 28 (FIG. 1) of the inner ring 15. The first portion 48 has a thickness sized to permit its insertion between the face portion 30 of the inner ring 15 and the adjacent face sheet 13. The second portion 49 is hingedly or pivotally attached to the first portion 48 opposite the arcuate upper edge and is formed with an opening 50. The opening 50 is adapted to receive a nail, screw, hook, or other suitable fastener (not shown) that is attached to the wall. Preferably the insert 47 is made of a single die cut cardboard piece folded to form the first and second portions.

The insert 47 is shipped in the Package 10 between the face sheets 13. To hang the package 10 on the wall, the insert 47 is removed from the package 10 and the package 10 is reassembled. The package 10 is then oriented such that the graphics on the face sheet 13 adjacent the face portion 29

(FIG. 1) of the outer ring 14 are oriented as desired for display. The arcuate upper edge of the insert first portion 48 is inserted between the face portion 30 of the inner ring 15 and the face sheet 13 adjacent the face portion 30 of the inner ring 15 at the top of the CD package 10. The package 10 can then be hung on the wall by placing an end of the faster connected to the wall through the opening 50 formed by the insert second portion 49.

As shown in FIG. 6, the package 10 can further include an insert 51 for supporting the package 10 in a generally upright position on a table top or substantially horizontal support surface 52. The insert 51 has a first or upper inserting portion 53, a second or upper supporting portion 54, a third or lower inserting portion 55, and a fourth or lower supporting portion 56. The first portion 53 has an arcuate upper edge having a radius generally equal to the inside radius of the annular side portion 28 (FIG. 1) of the inner ring 15. The first portion 53 has a thickness sized to permit its insertion between the face portion 30 of the inner ring 15 and the adjacent face sheet 13. The second portion 54 is hingedly or pivotally attached to the first portion 53 opposite the arcuate upper edge and extends to the table top 52. The third portion 55 has an arcuate lower edge having a radius generally equal to the inside radius of the annular side portion 28 of the inner ring 15. The third portion 55 has a thickness sized to permit its insertion between the face portion 30 of the inner ring 15 and the adjacent. The fourth portion 56 is hingedly or pivotally attached to the third portion 55 opposite the arcuate lower edge and extends to the table top 52 where it is hingedly or pivotally attached to the second portion 54. Preferably the insert 51 is made of a single die cut cardboard piece folded to form the portions 53, 54, 55, 56.

The insert 51 is shipped in the Package 10 between the face sheets 13. To display the package 10 on the table top 52, the insert 51 is removed from the package 10 and the package 10 is reassembled. The package 10 is oriented such that the graphics on the face sheet 13 adjacent: the face portion 29 (FIG. 1) of the outer ring 14 are oriented as desired for display. The edges of the first and third portions 53, 55 are assembled in the ring 15 as illustrated in FIG. 6. The package 10 can then be supported on the table top 52 for display by placing the bottom of the package 10 and a hinge 57 between the second and fourth portions 54, 56 of the insert 51 onto the table top 52 as shown in FIG. 6.

Figure 7:
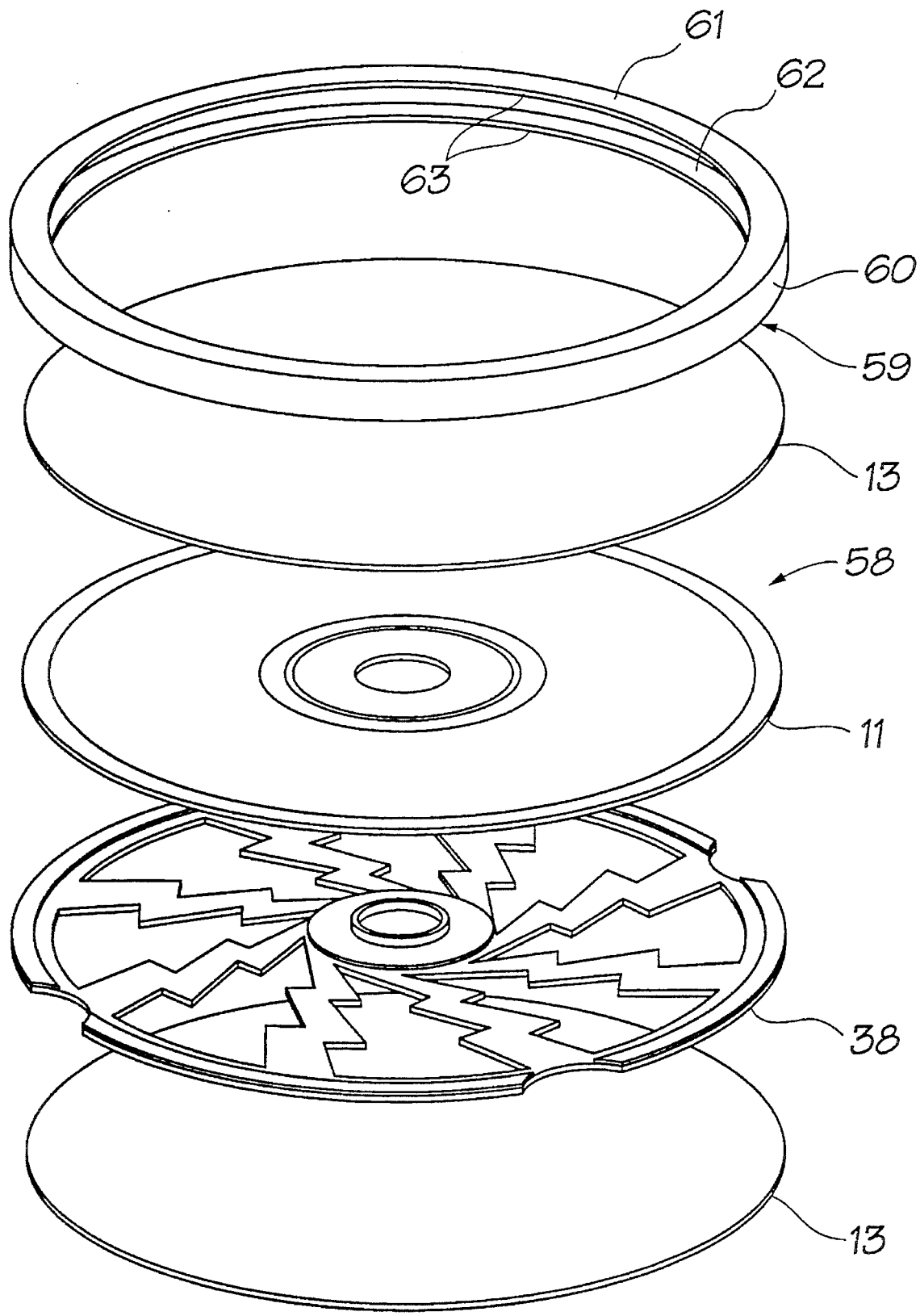
FIG. 7 is an exploded view of a second embodiment of the package according to the present invention holding a CD.

With reference to FIG. 7, a package 58 according to a second embodiment of the present invention is shown. The top and bottom rings 14, 15 of the first embodiment (FIG. 1) are substituted with a ring or frame 59 of unitary construction. The remaining elements and variations of the first embodiment (FIGS. 1–6) are as described above. The ring 59 includes an annular or cylindrical portion 60 and first and second annular face portions 61, 62. The annular portion 60 has an inside diameter slightly larger than the diameter of the open disk holder 38 and the face sheets 13. The first face portion 61 extends radially inwardly at a right angle from a top or first end of the annular portion 60. The second face portion 62 similarly extends radially inwardly at a right angle from a bottom or second end of the annular portion 60. The first and second face portions 61, 62 both form openings 63 having a diameter less than the diameter of the CD 11, the open disk holder 38, and the face sheets 13.

The ring 59 is made of an elastomeric material such as KRAYTON, neoprene, polyurethane, rubber, or other suitable material. The ring 59 has sufficient elasticity to be elastically stretched or deformed around edges of the sandwich of elements.

Figure 8:
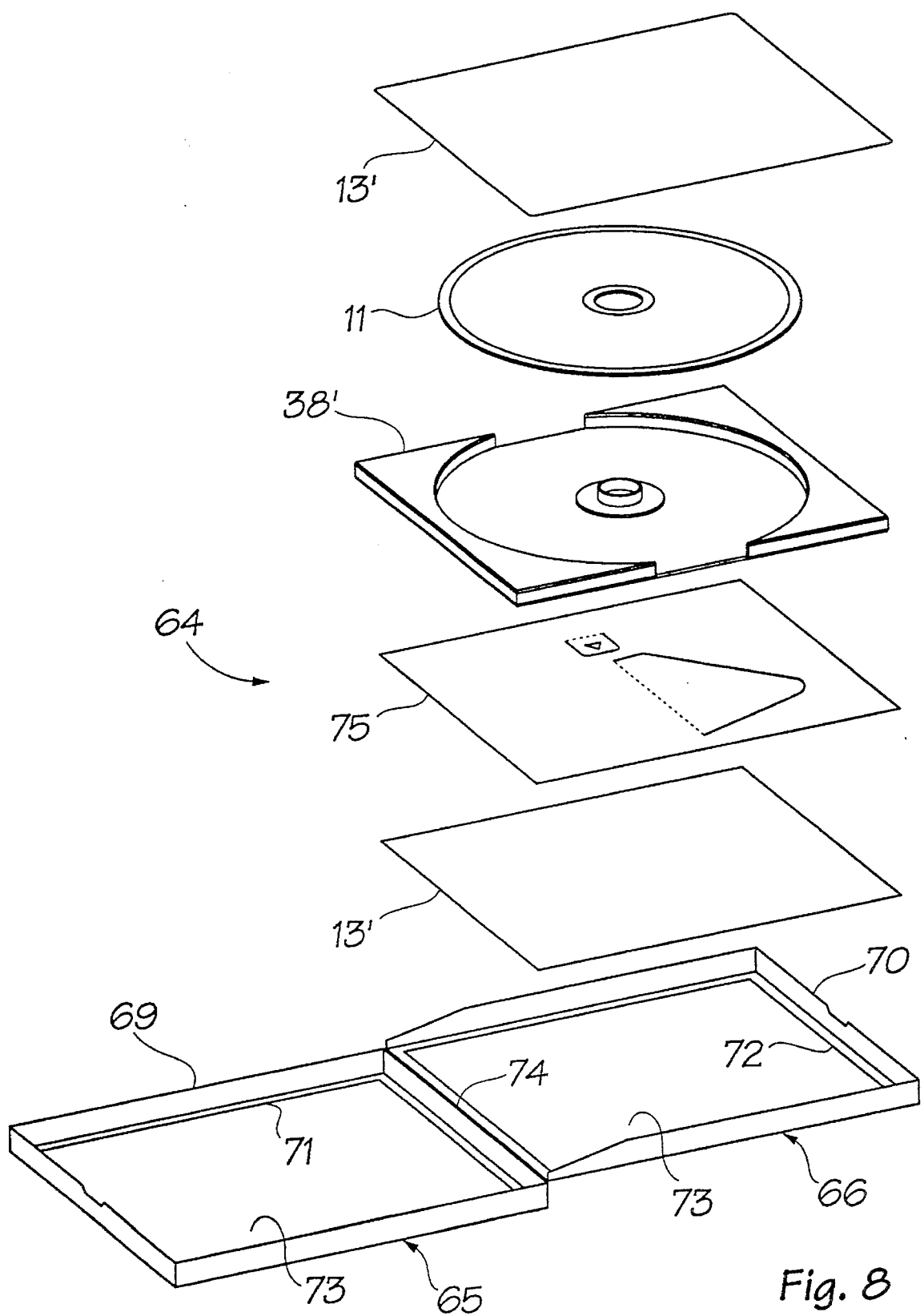
FIG. 8 is an exploded view of a third embodiment of the package according to the present invention holding a CD.

With reference to FIG. 8, a package 64 according to a third embodiment of the present invention is shown. The outer and inner rings or frames 14, 15 of the first embodiment (FIG. 1) are substituted with outer and inner rectangular frames 65, 66. The remaining elements and variations of the first embodiment (FIGS. 1–6) are as described above except that the open disk holder 38' and the face sheets 13' have an outer rectangular shape. The outer and inner rectangular frames 65, 66 each have a side portion 69, 70 and a face portion 71, 72. The side portion 70 of the inner frame 66 is sized slightly larger than the open disk holder 38' and the face sheets 13'. The face portion 72 inwardly extends at a right angle from a bottom end of the side portion 70. The side portion 69 of the outer frame 65 is sized to fit around the side portion 70 of the inner frame 66. Preferably, a friction fit between the outer and inner frames 65, 66 retains them together. It will be noted, however, that other suitable locking means could be utilized (for example see FIGS. 9–11). The face portion 71 of the outer frame 65 inwardly extends at a right angle from a top end of the side portion 69. The face portions 71, 72 form rectangularly-shaped openings 73 sized smaller than the open disk holder 38' and the face sheets 13' and larger than the CD 11. Preferably, the outer and inner frames 65, 66 are hingedly connected at a side by a living hinge 74.

The package 64 can further include an insert 75 for hanging and/or supporting the package. The insert 75 is as described for the inserts 47, 51 of the first embodiment except that it has an outer rectangular shape sized to be retained within the frames 65, 66.

The outer and inner rectangular frames 65, 66 are preferably fabricated by injection molding in one piece (unitary construction). The outer and inner rectangular frames 65, 66 are made of a rigid or semi-rigid plastic such as polypropylene, polyethylene, polyvinyl chloride, thermoplastic rubber, or other suitable material.

With reference to FIG. 9, a package 76 according to a fourth embodiment of the present invention is shown. A holder 77 of unitary construction similar to the disk holder 12 of the first embodiment (FIGS. 1 and 2) is used as a stand alone package. The holder 77 is as described above for the disk holder 12 of the first embodiment. Preferably, a protrusion or bead 79 is provided for locking the ring outer and inner hinged portions 24, 25 together. The bead 79 extends outwardly from the outer surface of the ring inner hinged portion 25 on a resilient tab formed by two slits 89. The bead 79 is adapted to be received in a slot or indentation 81 in the ring outer hinged portion 24 when the holder 77 is closed. The bead 79 preferably slightly protrudes from the slot 81 or is flush with the outer surface of the ring outer hinged portion 24 when closed. It will be noted that other suitable locking means could be utilized.

The package 76 preferably includes a disk protector/separator 82 to supply sufficient rigidity to protect the CD 11 or separate multiple CD's. The disk protector/separator 82 is preferably die cut from cardboard, plastic, or anti-static material. It will be noted that other items described above such as a booklet 16 can be included in the holder 77.

Graphics or other information is preferably printed on labels or decals adhered to the outer surface of the protection sheets 17. It will be noted however, that the graphics or other information could be directly printed by flexography or ferography.

As shown in FIG. 10, the holder 77 according to the fourth embodiment (FIG. 9) can be rectangularly shaped. The inside dimensions of the rectangular holder 77' are slightly larger than the outside diameter of the CD 11. The remaining elements and variations are as described above, except that the disk protector/separator 82' and the booklet 16' have another rectangular shape.

The Recording Industry Association of America, a trade group representing companies that produce or distribute about 90 percent of the recorded music sold in the United States says in its year-end report that sales of recorded music and music videos reached $10 billion in 1993, an increase of 11.3 percent over 1992's record sales of $9 billion. Compact discs represented the largest and fastest-growing format, with consumers spending $6.5 billion for the purchase of 495 million discs. See Sheila Rule, The Pop Life, The New York Times, Mar. 10, 1993. Besides the added convenience to the consumer, my CD packaging system would provide tremendous savings in plastic consumption. See table below showing the plastic consumption and savings (in US Tons) provided by my system in the production of 495 million CD packages.

| PLASTIC SAVED | PLASTIC WEIGHT (EACH) | PLASTIC CONSUMP- TION (US TONS) | PLASTIC SAVED (US TONS) | (%) |
|---|---|---|---|---|
| Jewel Box | 3.0 oz | 46,406 | — | — |
| First Embod. w/Pref. Disc Holder | 1.0 oz | 15,469 | 30,937 | 66.7 |
| First Embod. w/Open Disk Holder | 0.8 oz | 12,375 | 34,031 | 56.7 |
| First Embod. w/No Disc Holder | 0.5 oz | 7,734 | 38,672 | 83.3 |
| Fourth Embod. | 1.3 oz | 20,109 | 26,297 | 56.7 |

The holders 77, 77' shown in FIGS. 9 and 10 have parallel living hinges 21 on the protection sheets 17. The living hinges make possible unitary construction or molding in one piece (drawings show actual position in mold) and also insure easy access to contents and structural rigidity when both flaps or hinged portions 20 of the protection sheets 17 are closed. The application of this concept of unitary construction (circular, polygonal, or rectangular) with a set of living hinges 17 on opposite protection sheets 17 is not limited to a CD package. The same concept can be applied to package a number of consumer goods such as: computer floppy discs; audio/video tapes; valet for credit card, driver license, car registration, cash, and coins; cosmetic make-up pencils; crayons; circular saw blades or replacement gears; pharmaceuticals; and cigarettes (crush proof box).

As seen in FIGS. 11, 12, and 13, the various embodiments and variations described above have been adapted to hold a blister card of medication 83 and a circular saw blade 84. As seen in FIG. 11, the rectangular holder 77' can be adapted for holding a blister card 83. The blister card 83 retains a plurality of pills 85 between blisters 86 and an aluminum foil backed card 87. The rectangular holder 77' provides a child resistant container that can replace cardboard boxes that are not child resistant. The action required to open the box resists a small child from getting access to the contents. For adults it provides a convenient and easy to use container for medication.

With reference to FIG. 14, a holder 88 for storage or display of several of the packages 10 of the present invention is provided. The holder 88 includes a base 89 having equally spaced dividers 90 and a cover 91.

Although a particular embodiment of the invention has been described in detail, it will be understood that the invention is not limited correspondingly in scope, but includes all changes and modifications coming within the spirit and terms of the claims appended hereto.

What is claimed is:

1. A package for holding a disc, said package comprising a disc, two circular semi-rigid protection faces each having a diameter approximately the same as the outside diameter of said disc, and a ring separate from said protection faces and at the peripheries of said protection faces to retain said disk between said protection faces, wherein said protection faces and said ring collectively provide generally rigid package faces, said ring having an annular portion with first and second ends and first and second face portions inwardly extending from said first and second ends respectively, said face sheets being retained within said ring between said first and second face portions, said annular portion of said ring including separable concentric outer and inner elements, said first face portion extending from said outer element and said second face portion extending from said inner element, said first and second face portions of said ring each forming a circular opening having a diameter less than the diameter of said disc.

2. The package as set forth in claim 1, wherein said protection faces are provided by removable face sheets.

3. The package as set forth in claim 1, further comprising a disc holder between said face sheets for protecting said disc and having an outer diameter generally equal to a diameter of said face sheets.

4. The package as set forth in claim 3, wherein said disc holder is an open disc holder comprising a generally rigid base plate having a diameter slightly larger than said disc and a central holding member at a Central portion of said base plate for engagement with a center hole of said disc.

5. The package as set forth in claim 1, wherein said inner and outer elements are held together by friction between an outer surface of said inner portion and an inner surface of said outer portion.

6. The package as set forth in claim 1, wherein said face sheets are rigid.

7. The package as set forth in claim 1, further comprising a disc holder between said face sheets for protecting said disc and having an outer diameter generally equal to a diameter of said face sheets.

8. The package as set forth in claim 7, wherein said disc holder is an open disc holder comprising a generally rigid base plate having a diameter slightly larger than said disc and a central holding member at a central portion of said base plate for engagement with a center hole of said disc.

9. The package as set forth in claim 1, further comprising a booklet between said face sheets and having a diameter generally equal to the diameter of said disc.

10. The package as set forth in claim 1, wherein said package further comprises an insert for hanging said package, said insert having a first portion adapted for insertion between one of said face portions and an adjacent one of said face sheets and a second portion attached to said first portion and adapted for receiving a fastener.

11. The package as set forth in claim 1 including an insert for supporting said package in a generally upright position on a generally horizontal support surface, said insert having a first portion adapted for insertion between one of said face portions and an adjacent one of said face sheets, a second portion attached to said first portion and of sufficient length to extend to said horizontal support surface, a third portion adapted for insertion between said one of said face portions and said one of said face sheets generally opposite said first portion, and a fourth portion attached to and extending between said third portion and said second portion.

12. A package as set forth in claim 1, wherein said first and second face portions of said ring each have a generally planar outer surface elements forming prismatic radial ridges.

13. A package for holding a disc, said package comprising two circular semi-rigid protection faces each having a diameter approximately the same as the outside diameter of said disc, and a ring at the peripheries of said protection faces to retain said disc between said protection faces, wherein said protection faces and said ring collectively provide generally rigid package faces, said protection faces being provided by removable face sheets, said ring having an annular portion with first and second ends, and first and second face portions inwardly extending from said first and second ends of said annular portion respectively, wherein said face sheets are retained within said ring between said first and second face portions, said ring including separable concentric outer and inner elements, said first face portion extending from said outer element and said second face portion extending from said inner element, and a disc holder between said face sheets for protecting said disc and having an outer diameter generally equal to a diameter of said face sheets, said disc holder being of unitary construction comprising two circular protection sheets each having a diameter slightly larger than the outside diameter of said disc, and a holder ring at the peripheries of said protection sheets and extending between said protection sheets to retain said disc between said protection sheets, said protection sheets each having a fixed portion, a hinged portion, and a living hinge pivotally connecting said hinged portion to said fixed portion, said holder ring having a fixed portion extending between said protection sheet fixed portions and at least one hinged portion extending between said protection sheet hinged portions.

14. A package for holding a compact disc, said package comprising:
    a compact disc;
    an inner ring having an annular portion with an inside diameter slightly larger than the outside diameter of said compact disc, and a face portion inwardly extending from an end of said annular portion and forming an opening having a diameter smaller than the outside diameter of said compact disc;
    an outer ring having an annular portion concentric with and engaging an outside surface of said annular portion of said inner ring and being separable from said inner ring, and a face portion inwardly extending from an end of its annular portion and forming an opening having a diameter generally equal to said diameter of said inner ring opening, wherein said inner ring and said outer ring are removably interlocked by their mutual engagement;
    two circular semi-rigid face sheets each separate from a respective one of said rings and each having a diameter smaller than said inside diameter of said inner ring annular portion and larger than said diameter of said opening of said inner ring and said opening of said outer ring, wherein said face portions of said rings overlap on peripheral zones of faces of respective ones of said face sheets such that said face sheets are retained between said face portion of said inner ring and said face portion of said outer ring;
    a disc holder between said face sheets for protecting said compact disc and having a diameter generally equal to said compact disc.

15. A package as set forth in claim 14, wherein said disc holder is of unitary construction comprising two circular protection sheets each having a diameter slightly larger than the outside diameter of said compact disc, and a ring at the peripheries of said protection sheets and extending between said protection sheets to retain said compact disc between said protection sheets, said protection sheets each having a fixed portion, a hinged portion, and a living hinge pivotally connecting said hinged portion to said fixed portion, said ring having a fixed portion extending between said protection sheet fixed portions and at least one hinged portion extending between said protection sheet hinged portions.

16. The package as set forth in claim 15, further comprising a booklet between said face sheets and having a diameter generally equal to the diameter of said compact disc.

17. The package as set forth in claim 16, further comprising an insert for hanging said package, said insert having a first portion adapted for insertion between said face portion of said inner ring and an adjacent one of said face sheets and a second portion attached to said first portion and adapted for receiving a fastener.

18. The package according to claim 16, further comprising an insert for supporting said package in a generally upright position on a generally horizontal support surface, said insert having a first portion adapted for insertion between said face portion of said inner ring and an adjacent one of said face sheets, a second portion attached to said first portion and of sufficient length to extend to said horizontal support surface, a third portion adapted for insertion between said face portion of said inner ring and said adjacent one of said face sheets generally opposite said first portion, and a fourth portion attached to and extending between said third portion and said second portion.

19. A package for holding a compact disc, said package comprising a compact disc, separable outer and inner frames each having a side portion and a face portion inwardly extending from an end of said side portion, said face portion forming an opening generally smaller than the outside diameter of said compact disc, two semi-rigid face sheets each separate from a respective one of said frames and each being generally larger than an associated one of said openings and smaller than said side portion of said inner frame, and a generally rigid disc holder between said face sheets for holding and supporting said compact disc, wherein said face sheets and said disc holder are retained within said outer and inner frames by an overlapping of said face portions on a peripheral zone the faces of said face sheets with said face sheets being exposed by said openings bounded by said face portions.

20. The package as set forth in claim 19, wherein said outer and inner frames are generally rectangularly-shaped.

21. A package of unitary construction comprising two protection sheets, and a side portion at the peripheries of said protection sheets and extending between said protection sheets, said protection sheets each having a fixed portion, a hinged portion, and a living hinge pivotally connecting said hinged portion to said fixed portion, said side portion having a fixed portion extending between said protection sheet fixed portions and at least one hinged portion extending between said hinged portions of said protection sheets.

22. The package as set forth in claim 21, wherein said protection sheets are rectangularly shaped.

23. A package of unitary construction for holding a compact disc, said package comprising a compact disc, two circular protection sheets each having a diameter slightly larger than the outside diameter of said compact disc, and a ring at the peripheries of said protection sheets and extending between said protection sheets to retain said disc between said protection sheets, said protection sheets each having a fixed portion, a hinged portion, and a living hinge pivotally connecting said hinged portion to said fixed portion, said ring having a fixed portion extending between said protection sheet fixed portions and at least one hinged portion extending between said protection sheet hinged portions.

* * * * *